United States Patent
Ashbacher

(10) Patent No.: US 10,194,177 B1
(45) Date of Patent: Jan. 29, 2019

(54) INTERWEAVING MEDIA CONTENT

(71) Applicant: Sorenson Media, Inc., Draper, UT (US)

(72) Inventor: Andrew L. Ashbacher, Santa Cruz, CA (US)

(73) Assignee: Sorenson Media, Inc., Draper, UT (US)

( * ) Notice: Subject to any disclaimer, the term of this patent is extended or adjusted under 35 U.S.C. 154(b) by 52 days.

(21) Appl. No.: 14/881,852

(22) Filed: Oct. 13, 2015

Related U.S. Application Data

(60) Provisional application No. 62/064,949, filed on Oct. 16, 2014.

(51) Int. Cl.
| | |
|---|---|
| *H04N 7/10* | (2006.01) |
| *H04N 7/025* | (2006.01) |
| *H04N 21/234* | (2011.01) |
| *G11B 27/031* | (2006.01) |
| *H04N 21/845* | (2011.01) |
| *G11B 27/10* | (2006.01) |
| *H04N 21/458* | (2011.01) |
| *H04N 21/262* | (2011.01) |

(52) U.S. Cl.
CPC ..... *H04N 21/23424* (2013.01); *G11B 27/031* (2013.01); *G11B 27/10* (2013.01); *H04N 21/262* (2013.01); *H04N 21/458* (2013.01); *H04N 21/8456* (2013.01)

(58) Field of Classification Search
CPC . H04N 21/4331; H04N 21/458; H04N 21/812
See application file for complete search history.

(56) References Cited

U.S. PATENT DOCUMENTS

| | | | | |
|---|---|---|---|---|
| 8,352,981 B1* | 1/2013 | Oztaskent | ............... | G06Q 30/02 |
| | | | | 725/34 |
| 8,544,038 B2* | 9/2013 | Marko | ................. | G11B 27/034 |
| | | | | 725/32 |
| 8,799,941 B2* | 8/2014 | Nguyen | ................. | H04H 60/00 |
| | | | | 725/32 |
| 2004/0194131 A1* | 9/2004 | Ellis | .................... | H04N 5/44543 |
| | | | | 725/34 |
| 2004/0244035 A1* | 12/2004 | Wright | ................... | H04H 20/28 |
| | | | | 725/32 |

(Continued)

*Primary Examiner* — Gigi L Dubasky
(74) *Attorney, Agent, or Firm* — Honigman Miller Schwartz and Cohn LLP

(57) ABSTRACT

An electronic device and method for media content to be replaced other media content is disclosed. The method includes receiving first media content comprising a set of media content segments. The method includes receiving second media content comprising a first media content segment. The method includes receiving scheduling information identifying a second media content segment of the set of media content segments to be replaced with the first media content segment. The method includes determining that the first content feed is transmitted according to a first broadcast timing and that the second content feed is transmitted according to a second broadcast timing. The method includes syncing the first broadcast timing with the second broadcast timing. The method includes replacing the second media content segment with the first media content segment when the first content feed and the second content feed are synced.

16 Claims, 11 Drawing Sheets

(56) References Cited

U.S. PATENT DOCUMENTS

| | | | |
|---|---|---|---|
| 2010/0017820 A1* | 1/2010 | Thevathasan | G11B 27/036 725/35 |
| 2012/0166289 A1* | 6/2012 | Gadoury | G06Q 30/0269 705/14.66 |
| 2014/0025836 A1* | 1/2014 | Gupta | H04N 21/8456 709/231 |
| 2014/0150019 A1* | 5/2014 | Ma | G06O 30/0251 725/34 |
| 2014/0237520 A1* | 8/2014 | Rothschild | H04N 21/236 725/88 |
| 2015/0106841 A1* | 4/2015 | Wolf | H04N 21/812 725/32 |
| 2015/0172737 A1* | 6/2015 | Lechner | H04N 21/812 725/32 |

\* cited by examiner

INTERWEAVING MEDIA CONTENT

CROSS-REFERENCE TO RELATED APPLICATION

This application claims the benefit of U.S. Provisional Application No. 62/064,949, filed Oct. 16, 2014, the entire disclosure of which is incorporated herein by this reference.

BACKGROUND

Media content can be provided to a view using many different kinds of channels, such as cable television (TV), satellite TV, a digital video disc (DVD), media download, or streaming media content over the internet. Online media content, such as digital video and broadband video services, continues to gain interest for online user. For example, online users can access media downloads, video-conferencing or teleconferencing, news media outlets, broadband media services, video-on-demand, interactive TV, or live video streaming.

When media content is made available online, the media content can be decoded and displayed by smartphones, portable video players, tablets, laptops, smart TVs, or stand-alone media player. Streaming live media content, such as live broadcast media feeds, can be limited because of the complexity of assembling and integrating the operation of multiple components and processes to provide media content to devices capable of accessing the media online.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DESCRIPTION OF EMBODIMENTS

To provide viewers with media content, content creators or providers may stream media content to viewers by delivering the media content over the Internet to the viewers. Many content creators or providers may desire to integrate or replace a portion of the live media content with different content, such as replacing advertisement content of live broadcast media with other advertisement content. Conventionally, advertisers have relied on one media content stream for all viewers with the only targeting being performed before broadcasting or streaming of the media content. The limited targeting before broadcasting or streaming of the media content can be performed using on an audience analysis and ratings providers. The broadcast or streamed media content is a linear media channel where the media content is provided from a live media feed source to a viewer. In one example, content creators or providers may desire to integrate media content from a live broadcast media and prerecorded advertising media. In another example, content creators or providers may desire to integrate media content from multiple live broadcast media feeds. Conventionally, integrating media content from multiple streams can be difficult.

The word "content" can be used to refer to media or multimedia. The word "content" can also be a specific term that means the subject matter of the medium rather than the medium itself. Likewise, the word "media" and some compound words that include "media" (e.g. multimedia, hypermedia) are instead referring to content, rather than to the channel through which the information is delivered to the end user/audience. An example of a type of content commonly referred to as a type of media is a "motion picture" referred to as "a film."

Described herein are methods, systems, and devices for providing a media content with integrated content using a linear channel. The methods, systems, and devices can further enable uploading, augmenting, and delivering linear channels with integrated content to viewers online (e.g. connected to the Internet). The linear channel can be created using an ingest device and a server. In another example, the server is hardware to store or process data. In one example, the server is a cloud storage device to store data. In another example, the server is software executed on the server to provide cloud-services. In another example, the server can be software executed on the server to provide web-services of metadata services.

Figure 1:
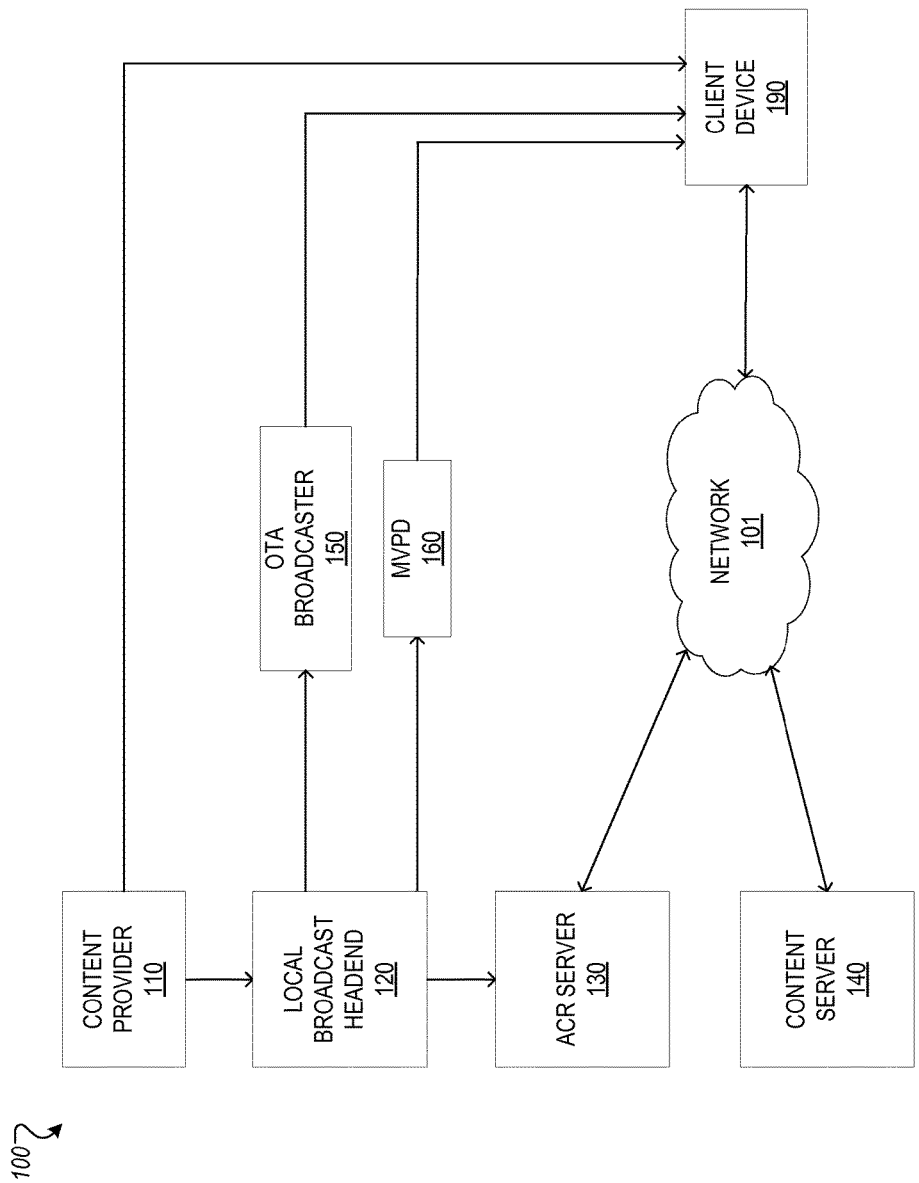
FIG. 1 illustrates a system diagram of a content distribution network according to one embodiment.

FIG. 1 illustrates a system diagram of a content distribution network 100 according to one embodiment. A local broadcast headend 120 receives an original broadcast feed from a content provider 110. The local broadcast headend 120 may generate a local broadcast feed based on the original broadcast feed. For example, the local broadcast headend 120 may be a local affiliate broadcaster receiving a network channel with programming and advertisements.

The local broadcast headend 120 may transmit the local broadcast feed to an over-the-air (OTA) broadcaster 150 that wirelessly transmits the local broadcast feed over the air to a client device 190. The local broadcast headend 120 may also or alternatively transmit the local broadcast feed to a multichannel video programming distributor (MVPD) 160 that transmits the local broadcast feed to the client device 190 via a cable, satellite, or a telecommunications network.

The client device 190 may include an antenna to receive the local broadcast feed over the air from the OTA broadcaster 150. The client device 190 may also or alternatively include a set-top box to receive the local broadcast feed from the MVPD 160 over a cable, satellite, or telecommunications network. The client device 190 may also or alternatively receive a content feed directly from the content provider 110 over an Internet connection or network connection. The client device 190 may include a display device to display the content feed or an altered version of the content feed to a viewer. In one example, the client device may be a television (TV) or a smart-TV. Various components of the client device 190 may be integrated into the client device 190, such as in the form of a smart television that includes an antenna, a set-top box, and a display device in a single unit.

The local broadcast headend 120 also provides the local broadcast feed to an automatic content recognition (ACR) server 130. The ACR server 130 may instruct the client device 190, via a network 101 (such as the Internet), to replace portions of the content feed with replacement advertisements that the client device 190 can retrieve, via the network 101, from a content server 140. The ACR server 130 may reside entirely within the local broadcaster headend 120, as a separate component remote from the local broadcaster headend 120, or a functionality of the ACR server 130 may be split between an ACR server component in the local broadcaster headend 120 and an ACR component residing on a remote server accessible via the network 101 as a "cloud" component.

Figure 2:
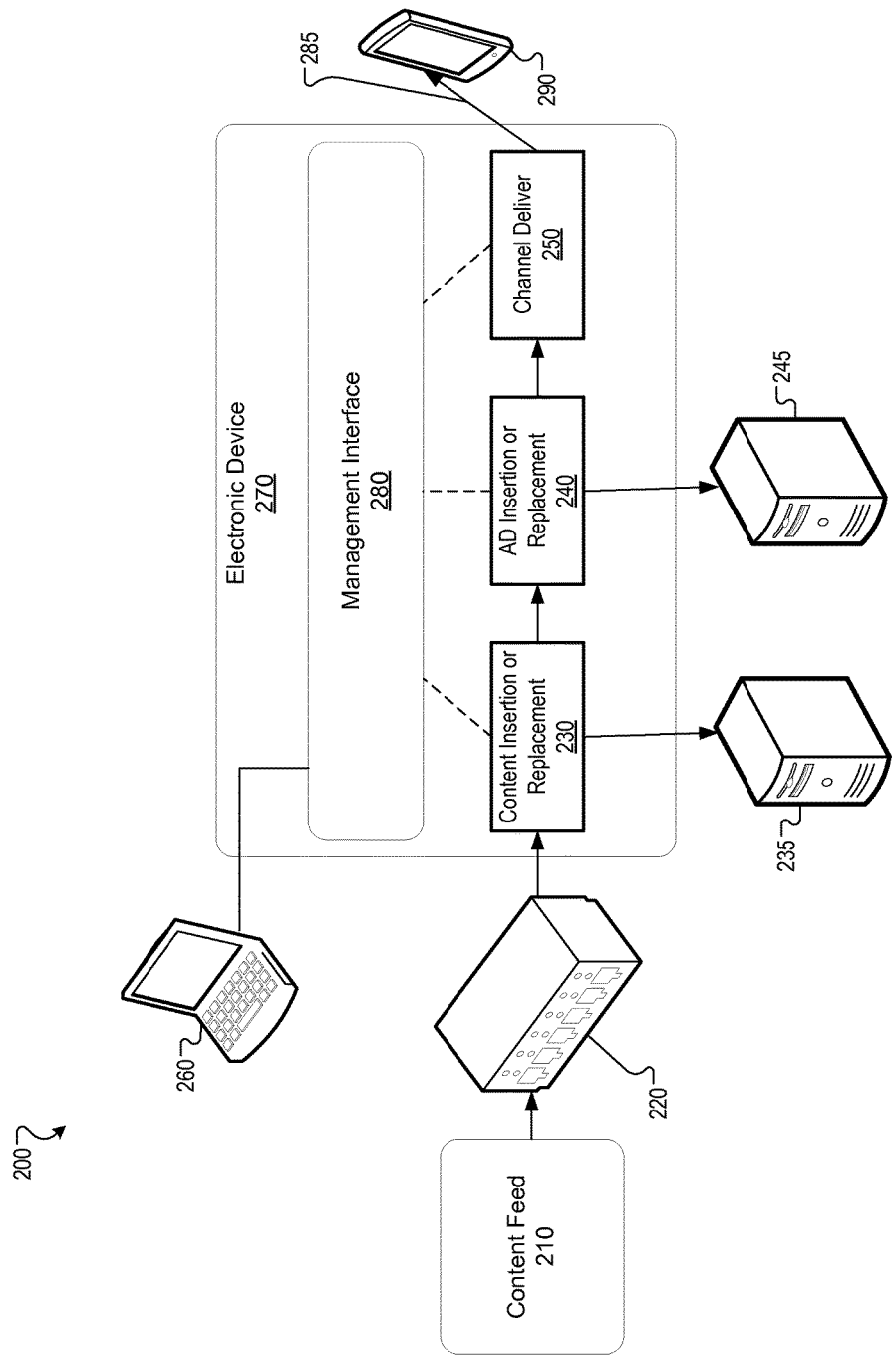
FIG. 2 depicts a diagram of interweaving media content from two sources according to one embodiment.

FIG. 2 depicts a flowchart of media content through a media content system 200. The media content system 200 can include a content feed 210, an ingest device 220, a user device 260, an electronic device 270, and a display device 290. In one example, the ingest device 220 is a rack-mount server. In another example, the ingest device 220 is an ingest server. The ingest device 220 can receive a content feed 210. In one example, the content feed 210 is a live video feed. In another example, the content feed 210 is a high definition serial digital interface (HD-SDI) feed. The ingest device 220 can transmit the content feed to the electronic device 270. In one example, the electronic device 270 is a remote computing device. In another example, the electronic device 270 is a cloud-based server. The electronic device executes software that provides web services. The ingest device 220 can schedule and program media content. For example, the ingest device 220 can schedule when stored media content is played or when live media content is broadcast. The ingest device 220 can send an output stream with the media content to the electronic device 270.

One advantage of the ingest device 220 can be that the ingest device 220 has minimal configuration and/or setup sets or time for a user to provide the linear stream to a viewer. For example, a user can sign up for a web service of the electronic device 270 using the user device 260. In this example, the user can then receive the ingest device 220, connect content feeds to input ports of the ingest device 220, and begin using the web services to augment content feeds. Another advantage of the ingest device 220 can be to reduce the complexity of system to augment live content feeds and reduce overhead, such as maintenance, support, and troubleshooting overhead.

In one embodiment, the electronic device 270 can include a management interface 280. The management interface 280 can receive management information to augment the received media content. In one example, a broadcast channel identifier is associated with the media feed and can be used to retrieve schedule information or schedule metadata from a metadata service. The metadata service can be a software program running on an electronic device that provides schedule information or schedule metadata, including: a content or show name, a season number, an episode number, and so forth. In another embodiment, the management interface 280 can receive an instruction from the user device 260 to associate the broadcast channel identifier with the media feed. In another embodiment, the management interface 280 can compare the broadcast channel identifier of the media feed with a list of known or predetermined broadcast channel identifiers to determine the schedule information.

In one example, the media content received at the electronic device 270 is a live content feed. In another example, the received media content is a delayed content feed. In another example, the received media content is a video file or a video-on-demand feed. The management interface 280 can augment the received media content before delivering augmented media content to the display device 290.

The management interface 280 can receive management information from the user device 260. In one example, the management information includes augmentation instructions indicating how the management interface 280 is to augment the uploaded media content. In another example, the management information includes other media content that the management interface 280 can use to augment the received media content.

The management interface 280 can augment the received media content with other media content (230). The management interface 280 can retrieve content from a server or database 235 that stores media content for insertion. For example, a broadcaster can use the user device 260 to send a message to the management interface 280 to retrieve media content from the server 235 to use for media content replacement. For example, the management interface 280 can augment the received media content by inserting content into a blank portion of the received media content. In this example, a live media broadcast may include spaces within the live media broadcast for advertisements to be added. In another example, the management interface 280 can augment the received media content by replacing a portion of the received media content with media content from another live media content feed.

The management interface 280 can augment the received media content with ADs (240). The management interface 280 can retrieve ADs from a server or database 245 that stores ADs for insertion. In one embodiment, an advertiser can select the ADs to be retrieved and used for replacement. For example, an advertiser can use the user device 260 to send a message to the management interface 280 to select the ADs to be retrieved and used for replacement. In another embodiment, the management interface 280 can receive a message from an AD network selecting the ADs to be retrieved and used for replacement. In one example, the AD network can have a time schedule identifying when to send ADs to the management interface 280. In one example, the AD network can have database identifying a targeted viewer to send ADs to the management interface 280 to be displayed to the targeted viewer on the display device 290.

In one example, the management interface 280 can augment the received media content by inserting an AD into a blank AD space of the received media content. In another example, the management interface 280 can augment the received media content by replacing a first AD in the uploaded media content with a second AD. For example, the management interface 280 can overlay the second AD on top of the first AD in the received media content.

Figure 3A:
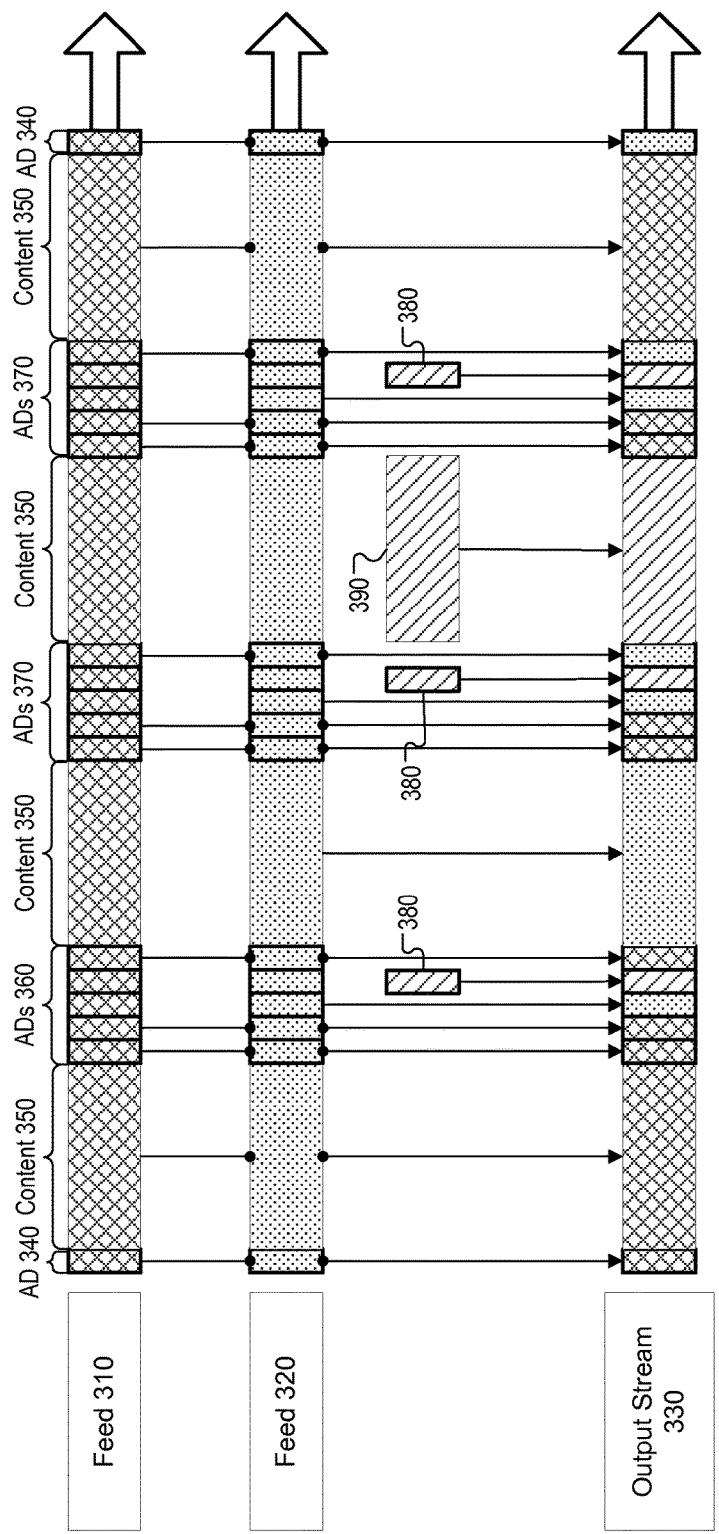
FIG. 3A depicts a simple interweaving method according to one embodiment.

FIG. 3A illustrates interweaving media content from feed 310 and feed 320 to create an augmented output stream 330 according to one embodiment. In one embodiment, the feed 310 can be a first live feed from a first source and the feed 320 can be a second live feed from a second source. The feed 310 and the feed 320 can include media content. The media content can include: a single AD 340; media content 350; or multiple ADs 360. In this example, live media content received from the ingest device 220 can be interweaved with pre-recorded video content stored on the memory device. In one example, the pre-recorded video content is an advertisement. In one embodiment, the management interface 280 (FIG. 2) can interweave the single AD 340, the media content 350, or the multiple ADs 360 of the feed 310 with the single AD 340, the media content 350, or the multiple ADs 360 of the feed 320 to create an output stream 330.

The management interface 280 can insert pre-recorded video content into a linear media streams. In one example, the electronic device 270 (FIG. 2) can interweave media segments from the feed 310 or 320 with existing channels or other media content stored at a memory device coupled to the electronic device 270. In another embodiment, the management interface 280 can interweave stored content 380 or 390 stored at the electronic device 270 or a memory device coupled to the electronic device 270.

In one embodiment, the management interface 280 can receive scheduling information from the user device 260 instructing the management interface 280 when to insert the single AD 340, the media content 350, or the multiple ADs 360. In one example, the user device 260 can display a graphical user interface (GUI) for a user to select a location to insert the single AD 340, the media content 350, or the multiple ADs 360.

Returning to FIG. 2, the GUI can be a web portal accessing the electronic device 270. For example, the management interface 280 can receive scheduling information from the user device 260 indicating where to integrate pre-recorded video content into live media content. In this example, a user can use the GUI on the user device 260 to select when the pre-recorded video content may be integrated in the live media content.

In one embodiment, the management interface 280 can receive a selection message identifying video content stored in a memory of the electronic device 270. For example, a user can select media content from available media content in the memory using a GUI on the user device 260. The user can also select a point in time at which the media content should be inserted into an initial content stream and specify the duration of the content being inserted. The user device 260 can associate a unique identifier with the content to be inserted. The unique identifier can include a threaded message server (TMS) ID, an AD ID, or an entertainment ID registry (EIDR) ID. In one example, the unique identifier can be used to obtain information (such as metadata) for the media content from a memory of the electronic device 270. In another example, a user device 260 can add information about the media content being inserted. The additional information can include a content name, a season number, an episode number, and so forth.

In one example, the management interface 280 can schedule an insertion of media content using time codes to indicate where in the content stream a media content segment can be inserted, the duration of the segment, and/or insertion rules or criteria for inserting the content segment. The insertion rules or criteria can indicate where to insert specific content. For example, the insertion rules or criteria can be used to insert content or ADs into a media content stream in view of the integration requirements for third-party content or an AD network.

The management interface 280 can transcode a resultant media content stream into a format for cross-platform playback. In one example, the management interface 280 can transcode the media content stream into a media streaming communications protocol. In another example, the management interface 280 can transcode a media content stream into a hypertext transfer protocol live streaming (HLS) format.

In one embodiment, when interweaving content from multiple streams or feeds, tags can be added to HLS index files before and after the entries for replacement media content. The following index file provides an example of EXT-X-DISCONTINUITY tags to identify entries for replacing media content:

EXTM3U
EXT-X-TARGETDURATION:10
EXT-X-VERSION:3
EXTINF:10,
target/stream-4-640000/frag-1.ts//Original Media Content
EXTINF:10,
target/stream-4-640000/frag-2.ts//Original Media Content
EXT-X-DISCONTINUITY//Replacement Media Content Beginning
EXTINF:10,
inserted/stream-4-640000/frag-1.ts//Replacement Media Content
EXTINF:10,
inserted/stream-4-640000/frag-2.ts//Replacement Media Content
EXTINF:10,
inserted/stream-4-640000/frag-3.ts//Replacement Media Content
EXT-X-DISCONTINUITY//Replacement Media Content Ended
EXTINF:10,
target/stream-4-640000/frag-6.ts//Original Media Content
EXTINF:10,
target/stream-4-640000/frag-7.ts//Original Media Content
EXT-X-ENDLIST The electronic device 270 can then deliver the resultant media content stream via a communication channel 285. In another example, the communication channel 285 can be a distributed network channel, such as streaming the media content over an Internet connection to a display device 290 for playback. In one example, the electronic device 270 can transmit the media content over the Internet via the cloud computing device to remote computer systems. In another example, the electronic device 270 can create viewer channels for the media content via the cloud computing device.

The electronic device 270 can communicate the output stream to the display device 290. In one embodiment, the management interface 280 can delay sending the output stream 330 to the display device 290 for a selected period of time. In one example, the selected delay can be seconds. In another example, the selected delay can be minutes. The management interface 280 can delay sending the output stream 330 to reduce or eliminate synchronization issues and latency events. In one embodiment, a latency event can occur for the output stream 330 when a first time stamp for the feed 310 is off of a second time stamp for the feed 320. For example, when the first time stamp is behind or ahead of the second time stamp the latency event will occur. In this example, there can be a gap while the latency of the output stream is delayed. One advantage of delaying sending the output stream 330 is to enable interweaving of multiple live feeds that are temporally offset from each other. One advantage of interviewing media content is to replace empty content spaces with advertisements that are targeted to a particular location, a particular viewer, or advertisements provided by the content creators or providers.

Figure 3B:
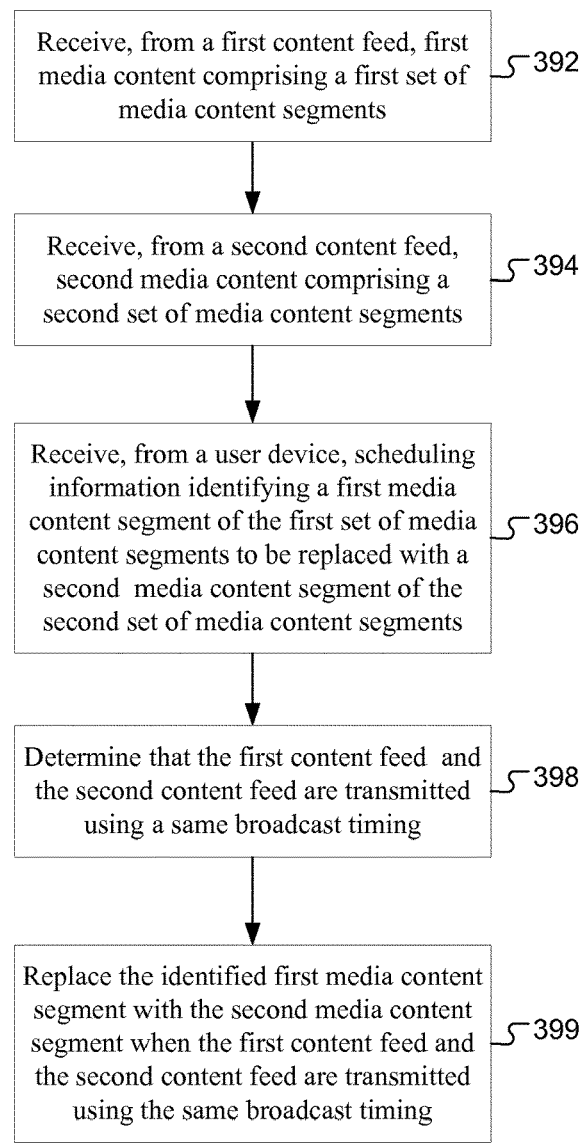
FIG. 3B illustrates a diagram of a method for replacing a first media content with a second media content according to one embodiment.

FIG. 3B illustrates a diagram of a method 300 for replacing a first media content with a second media content according to one embodiment. The method 300 may at least partially be performed by processing logic that includes hardware (e.g., circuitry, dedicated logic, programmable logic, microcode, etc.), software (e.g., instructions executed by a processing device), firmware or a combination thereof. The method 300 may be performed, at least in part, by processing logic of the ingest device 220 (FIG. 2) or the processing logic of the electronic device 270 (FIG. 2).

Referring to FIG. 3B, the method 300 begins with receiving, from a first content feed, first media content including a first set of media content segments (392). The method can include receiving, from a second content feed, second media content comprising a second set of media content segments (394). The method can include receiving, from a user device, scheduling information identifying a first media content segment of the first set of media content segments to be replaced with a second media content segment of the second set of media content segments (396). The method can include determining that the first content feed and the second content feed are transmitted using a same broadcast timing (398). The method can include replacing the identified first media content segment with the second media content segment when the first content feed and the second content feed are transmitted using the same broadcast timing (399).

Figure 4A:
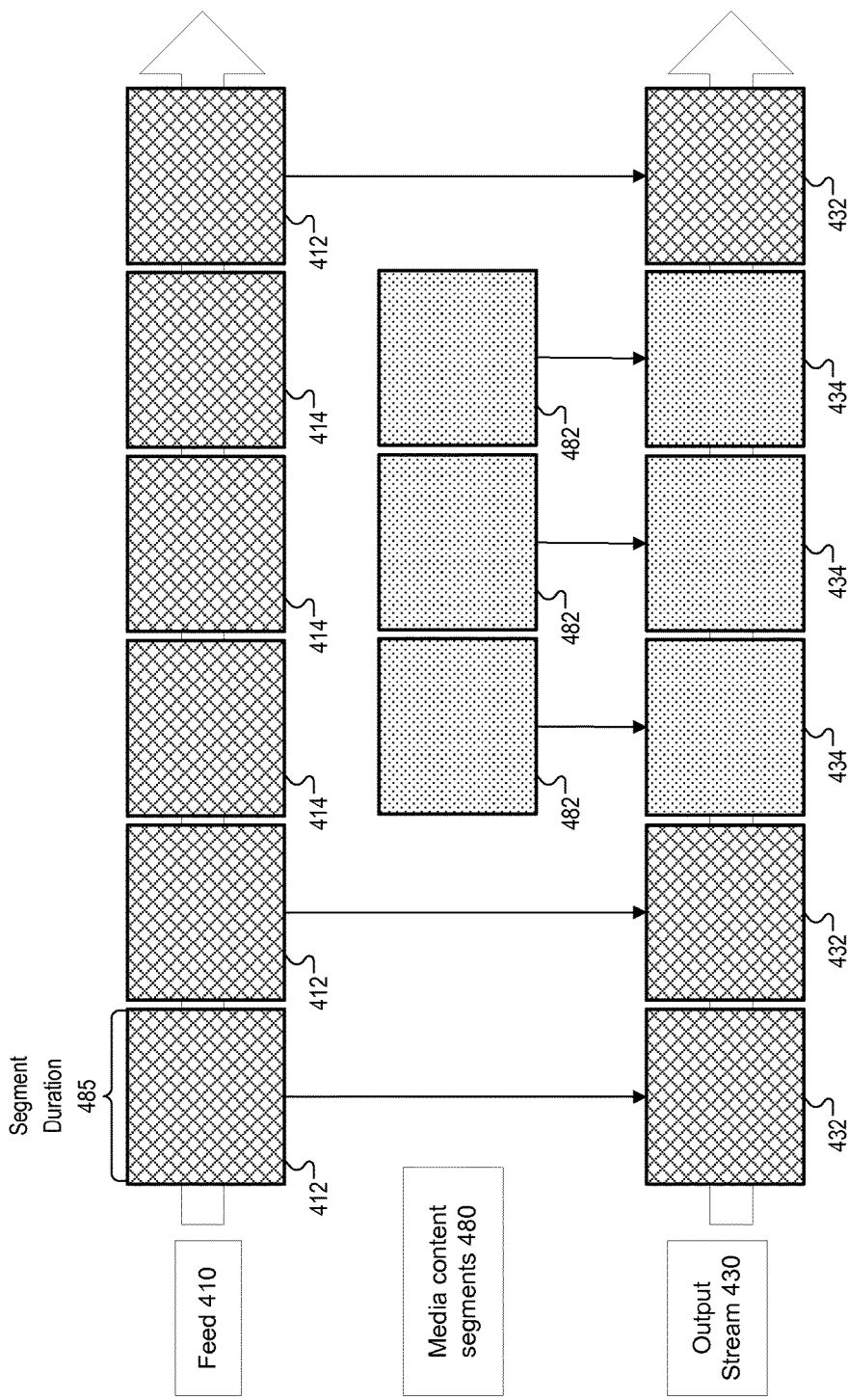
FIG. 4A depicts a complex interweave method according to one embodiment.

FIG. 4A illustrates direct interweaving media content from the feed 410 with stored media content segments 480. The feed 410 can include media content segments 412 and 414. The media content segments 412 and 414 from the feed 410 can be from an original content feed. The media content 480 can include media content segments 482. In one embodiment, one or more of the media content segments 482 can be copied from a database and can be overlayed on top of the media content segments 412 and 414 to create the output stream 430 with media content segments 432 and 434. In another embodiment, the output stream 430 can include the media content segments 432 that are copied from the media content segments 412 and the media content segments 434 that are copied from the media content segments 482.

In one example, the media content segments 412, 414, 432, 434, and 482 have segment durations that are period of time that the media content segments span. Each segment duration has a starting boundary where the period of time for the segment duration has a beginning boundary where the period of time of the segment duration begins and an ending boundary where the period of time of the segment duration ends. In one example, one of more of the segment durations for the media content segments 412, 414, 432, 434, and 482 are different. In another example, each segment duration for the media content segments 412, 414, 432, 434, and 482 is the same. When the segment durations for the media content segments 412, 414, 432, 434, and 482, the management interface 280 (FIG. 2) can line up the segment boundaries of the initial media content segments 414 with the segment boundaries of the replacement media content segments 482. One advantage of each segment duration being the same can be to enable the management interface 280 to insert the replacement media content segments 482 directly into the initial media content segments 414 locations in the output stream 430. When the replacement media content segments 482 is inserted directly into the initial media content segments 414 locations in the output stream 430, a delay in sending the output stream 430 to the display device 290 can be reduced or eliminated.

Figure 4B:
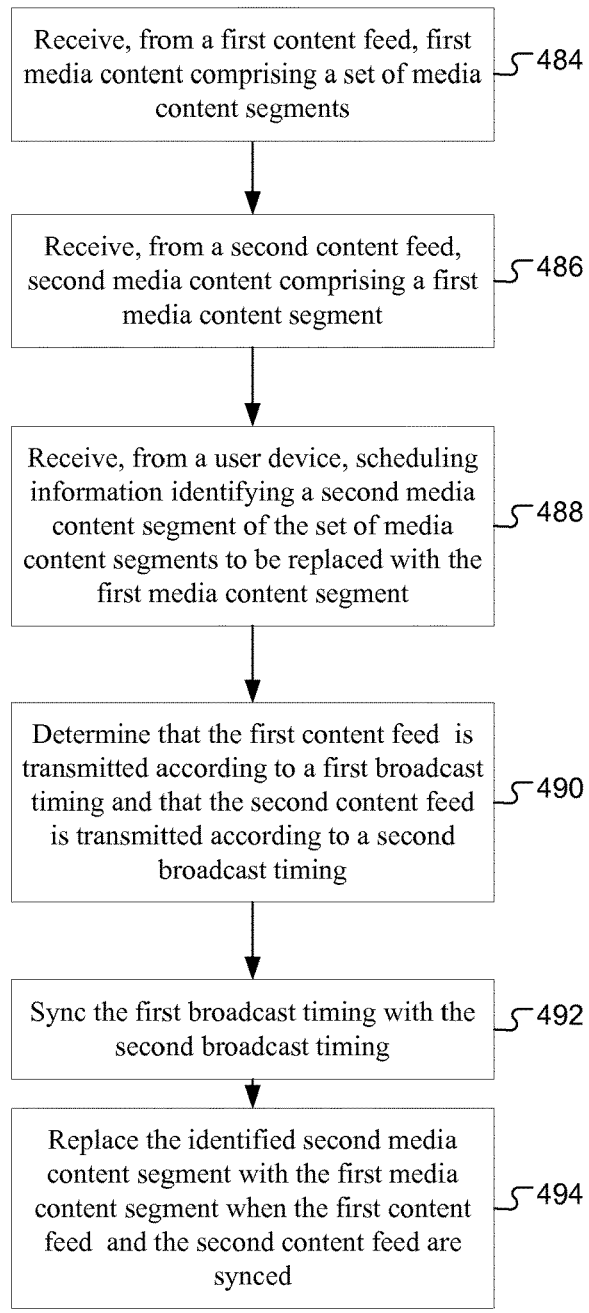
FIG. 4B illustrates a diagram of a method for replacing a first media content with a second media content according to one embodiment

FIG. 4B illustrates a diagram of a method 400 for replacing a first media content with a second media content according to one embodiment. The method 400 may at least partially be performed by processing logic that includes hardware (e.g., circuitry, dedicated logic, programmable logic, microcode, etc.), software (e.g., instructions executed by a processing device), firmware or a combination thereof. The method 400 may be performed, at least in part, by processing logic of the ingest device 220 (FIG. 2) or the processing logic of the electronic device 270 (FIG. 2).

Referring to FIG. 4B, the method 400 begins with receiving, from a first content feed, first media content including a set of media content segments (484). The method can include receiving, from a second content feed, second media content comprising a first media content segment (486). The method can include receiving, from a user device, scheduling information identifying a second media content segment of the set of media content segments to be replaced with the first media content segment (488). The method can include determining that the first content feed is transmitted according to a first broadcast timing and that the second content feed is transmitted according to a second broadcast timing (490). The method can include synchronizing the first broadcast timing with the second broadcast timing (492). The method can include replacing the identified second media content segment with the first media content segment when the first content feed and the second content feed are synced (494).

Figure 5A:
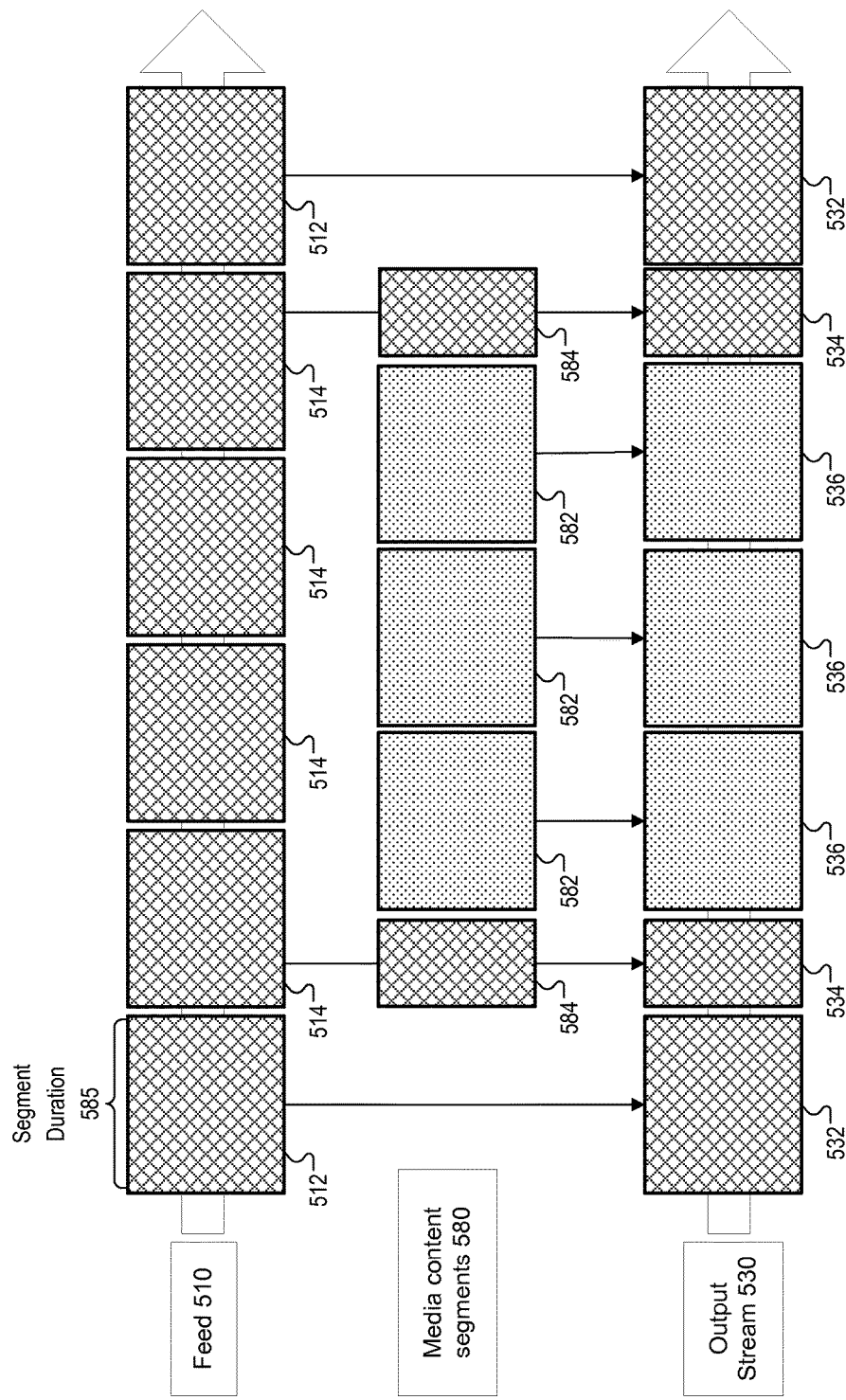
FIG. 5A illustrates flowchart for when a user, an individual, or an organization desire to deliver a linear channel over the Internet according to one embodiment.

FIG. 5A illustrates offset interweaving media content from the feed 510 with stored media content segments 580. In the complex interweaving, segment boundaries 585 of the replacement media content segments 582 do not line up with the initial media content segments 512 or 514. In one embodiment, when the segment boundaries 585 of the replacement media content segments 582 do not line up with the initial media content segments 512 or 514, the management interface 280 (FIG. 2) can split the initial media content segments 514 into sub-segments where the segment boundaries of the replacement media content segments 582 begin and end, respectively. In one example, the initial media content segments 514 can be split using a video encoder to ensure integrity of a resultant partial segments 584. One advantage of the offset interweaving is that output stream 530 can be sent to the display device 290 without having to adjust or control a content player of the display device 290 to view the offset replacement media content segments 582.

Figure 5B:
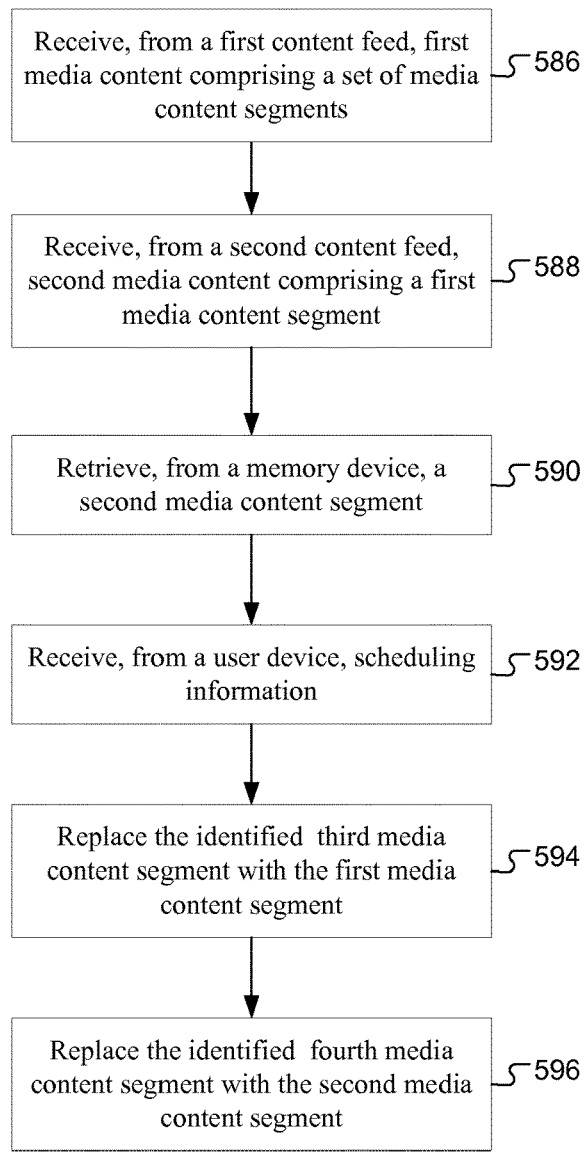
FIG. 5B illustrates a diagram of a method for replacing media content from a first content feed, with media content from a second content feed and a memory device according to one embodiment.

FIG. 5B illustrates a diagram of a method 500 for replacing media content from a first content feed with media content from a second content feed and a memory device according to one embodiment. The method 500 may at least partially be performed by processing logic that includes hardware (e.g., circuitry, dedicated logic, programmable logic, microcode, etc.), software (e.g., instructions executed by a processing device), firmware or a combination thereof. The method 500 may be performed, at least in part, by processing logic of the ingest device 220 (FIG. 2) or the processing logic of the electronic device 270 (FIG. 2).

Referring to FIG. 5B, the method 500 begins with receiving, from a first content feed, first media content comprising a set of media content segments (586). The method can include receiving, from a second content feed, second media content comprising a first media content segment (588). The method can include retrieving, from a memory device, a second media content segment (590). The method can include receiving, from a user device, scheduling information (592). In one example, the scheduling information includes information identifying a third media content segment of the set of media content segments to be replaced with the first media content segment. In another example, the scheduling information includes information identifying a fourth media content segment of the set of media content segments to be replaced the identified third media content segment with the first media content segment. The method can include replacing the identified third media content segment with the first media content segment (594). The method can include replacing the identified fourth media content segment with the second media content segment (596).

Figure 6:
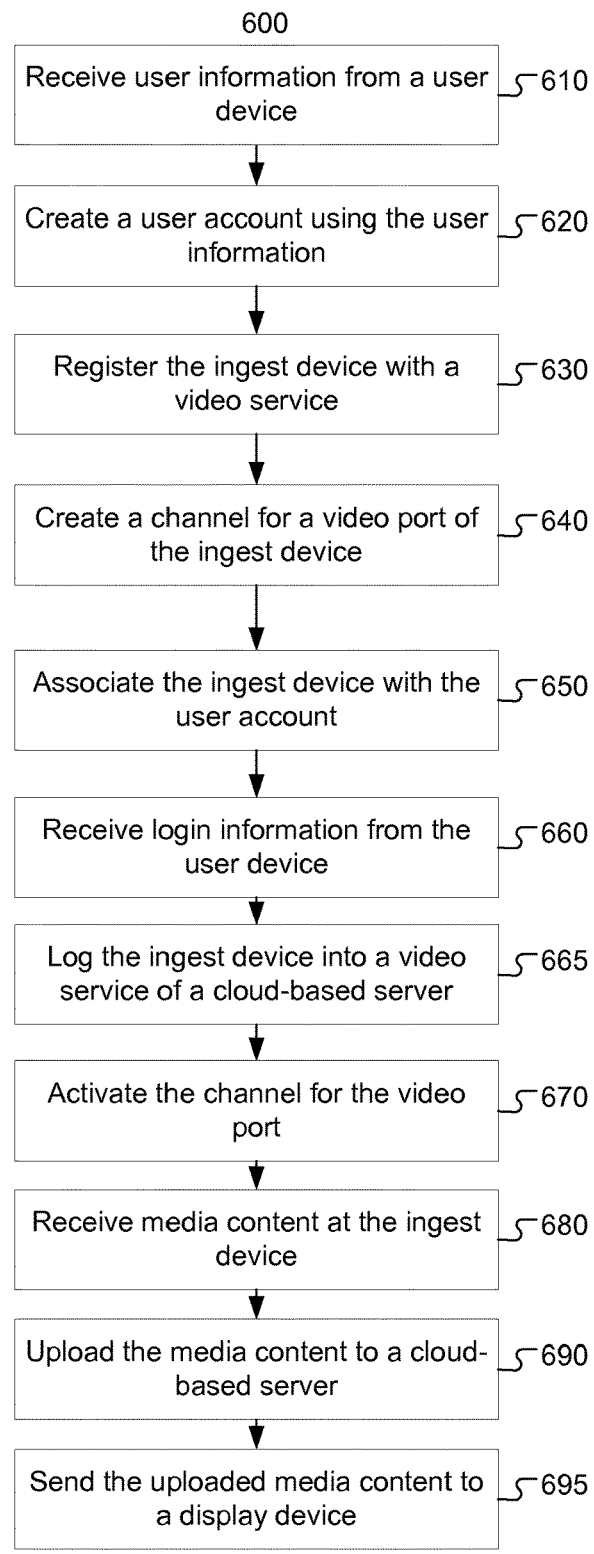
FIG. 6 illustrates a diagram of a method for deliver media content to a display device according to one embodiment.

FIG. 6 illustrates a diagram of a method 600 for deliver media content to a display device according to one embodiment. The method 600 may at least partially be performed by processing logic that includes hardware (e.g., circuitry, dedicated logic, programmable logic, microcode, etc.), software (e.g., instructions executed by a processing device), firmware or a combination thereof. The method 600 may be performed, at least in part, by processing logic of the ingest device 220 (FIG. 2) or the processing logic of the electronic device 270 (FIG. 2).

Referring to FIG. 6, the method 600 begins with an ingest device 220 (FIG. 2) receiving user information from a user device 260 (610). The method can include creating, by the ingest device, a user account using the user information (620). The method can include registering the ingest device with a video service (630). In one embodiment, the ingest device can be configured to connect with a cloud server using user registration information. For example, the ingest device can be preconfigured to connect with the cloud server prior to an installation of the ingest appliance. The ingest device can be preconfigured to enable the user to plug in the ingest device and begin using ingest device without any set-up (e.g. a plug-and-play ingest device).

In another embodiment, the ingest device can be preconfigured to connect to a cloud server prior to the ingest device receiving power or being installed into a user's system. In another embodiment, when the ingest device receives power from the user system, the ingest device can communicate identification information to a cloud computing device or a cloud-based server. In one example, the identification (ID) information can include a network card media access control (MAC) address of the ingest device. In another example, the ID information can include information indicating which ports of the ingest device are available to capture media content. The cloud computing device can provide cloud computing services to the ingest device. In one embodiment, a cloud-computing device can use the ID information to register the device at the cloud server. In another embodiment, the cloud-computing device can use the ID information to matching the device to a registration record stored at the cloud-computing device.

The method can include creating a channel or output stream destination for a video port or output port of the ingest device (640). For example, the ingest device can use an application program interface to create a channel or output stream destination for a user to view media content on a display device. In one example, the channel or the output stream destination can be a website or a hypertext markup language (HTML) web domain for the display device to access a content stream for display. The method can include associating the ingest device with the user account (650). The method can include receiving login information from a user device (660). The method can include logging the ingest device into a video service of an electronic device (665). The method can include activating the channel for the video port (670).

The method can include receiving media content at the ingest device (680). In one embodiment, the ingest device can receive media feed, such as a live broadcast feed, at one or more ports of the ingest device. For example, a user of the ingest device can plug a live video feed connection into an ingest device and the ingest device can route the live video feed.

The method can include uploading the media content to the electronic device (690). In another embodiment, the ingest device can enable a user to provide a media feed to a viewer via the electronic device. For example, the electronic device can provide a linear video stream to a display device, where the linear video stream is accessible to a viewer over the Internet. The method can include sending the uploaded media content to a display device (695).

Figure 7:
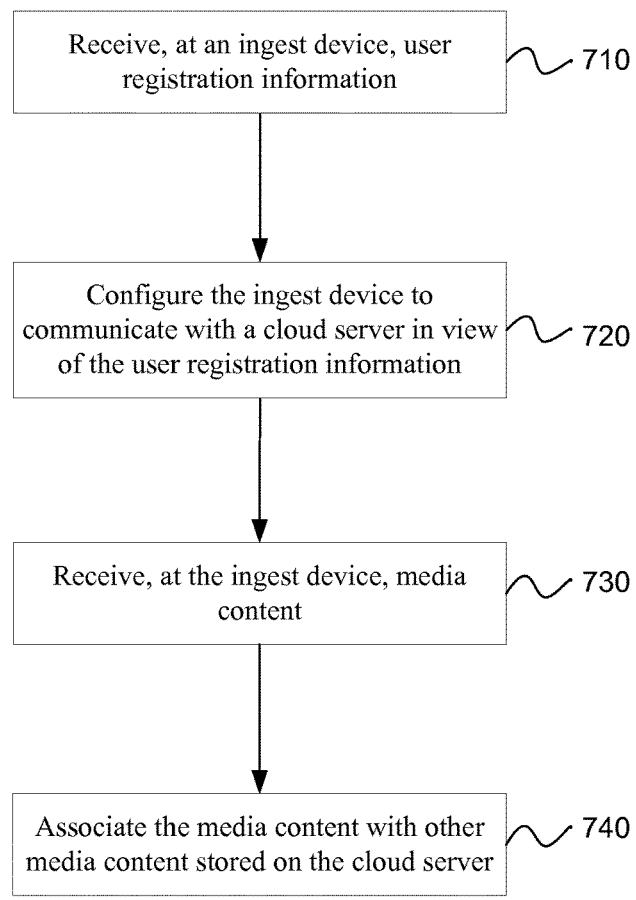
FIG. 7 illustrates a diagram of a method for associating media content with other media content according to one embodiment.

FIG. 7 illustrates a diagram of a method 700 for associating media content with other media content according to one embodiment. Method 700 may be performed by processing logic that may comprise hardware (e.g., circuitry, dedicated logic, programmable logic, microcode, etc.), software (such as operations being performed by the MCU), firmware or a combination thereof. In one embodiment, method 700 is performed by processor, a plurality of processors, a processor core, and/or a plurality of processor cores. Alternatively, other components of a computing system or software executing on the processor may perform some or all of the operations of the method 700.

Referring to FIG. 7, the method 700 begins by receiving, at an ingest device, user registration information (block 710). The method can include, configuring the ingest device (FIG. 2) to communicate with a cloud server in view of the user registration information (720). The method can include receiving media content at the ingest device (730). In one embodiment, a user device can display a web interface of the web portal to a user and receive user input to turn a channel on by clicking a link or button on a page showing a list of channels or a page showing details for a specific channel. In one example, a status of the channel can be a starting status in the web interface while service infrastructure may be allocated. In one example, the service infrastructure allocation is additional transcoding servers being started. In one embodiment, when the infrastructure is ready, the status of the channel can be changed to a ready status in the web interface when no content data is being delivered to the ingest device. In another embodiment, the status of the channel can be changed to a streaming status when content data is being delivered to the ingest device. In another embodiment, when video feed data is delivered to the ingest device with a channel in ready state, the status of the channel can switch to a streaming status and the content data can be available for playback.

In one embodiment, the display device can receive an HTML code from the electronic device or the ingest device. In one example, the display device can access media content on a website or integrate using the HTML code. In another example, the display device can integrate a video URL into a mobile application to provide a linear stream to a viewer.

The method can include associating the media content with other media content stored on the electronic device (740).

Figure 8:
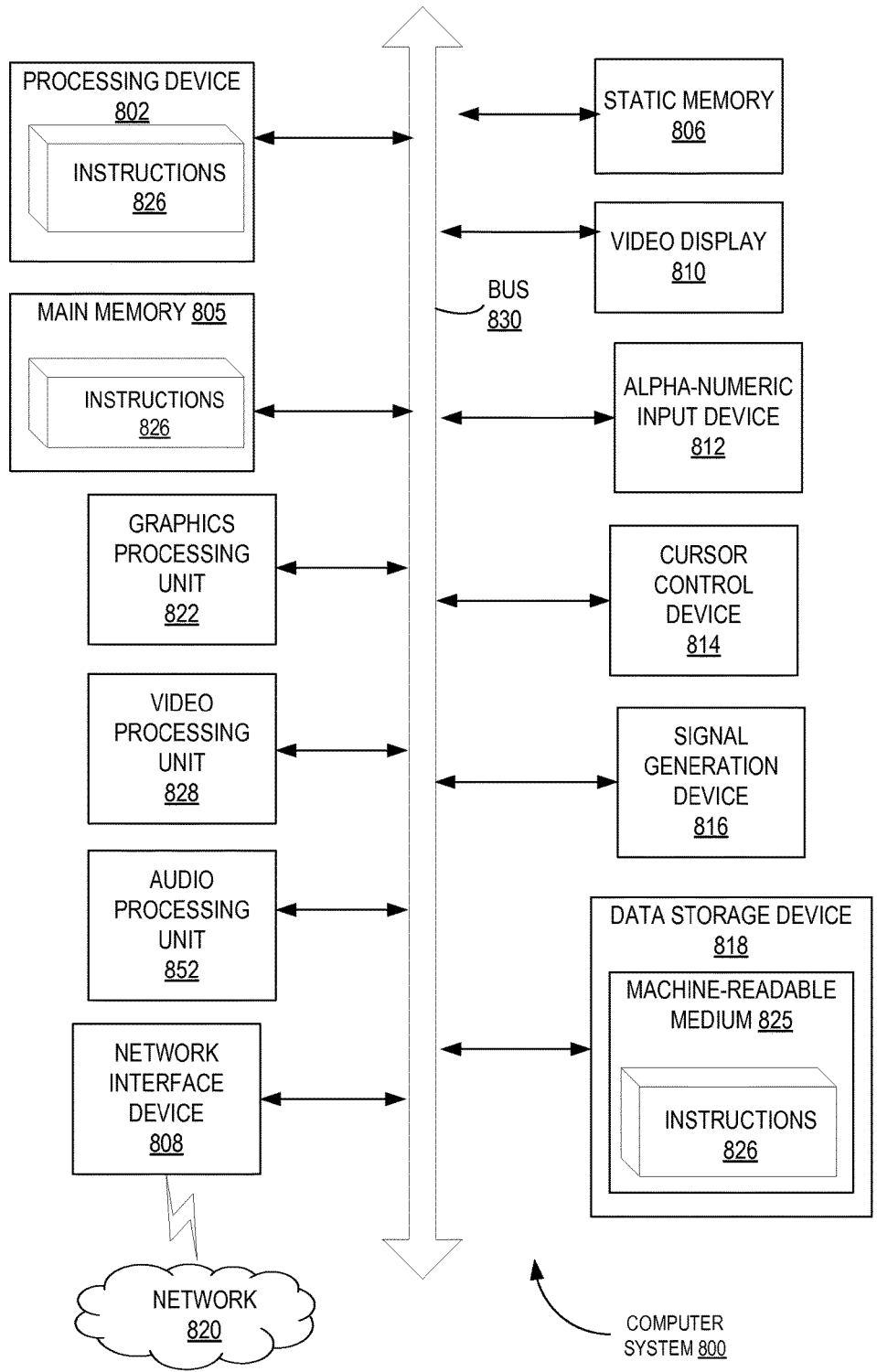
FIG. 8 illustrates a diagrammatic representation of a machine in the example form of a computer system within which a set of instructions, for causing the machine to perform any one or more of the methodologies discussed herein, may be executed.

FIG. 8 illustrates a diagrammatic representation of a machine in the example form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 800 may correspond to the ACR server 130 of FIG. 1. The computer system 800 may correspond to the client device 190 of FIG. 1. The computer system 800 may correspond to at least a component of the media content system 200.

The computer system 800 includes a processing device 802, a main memory 804 (e.g., read-only memory (ROM), flash memory, dynamic random access memory (DRAM) (such as synchronous DRAM (SDRAM) or DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. In one embodiment, processing device 802 may include one or more processing cores. The processing device 802 is configured to execute the instructions 826 of a mirroring logic for performing the operations discussed herein.

The computer system 800 may further include a network interface device 808 communicably coupled to a network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a signal generation device 816 (e.g., a speaker), or other peripheral devices. Furthermore, computer system 800 may include a graphics processing unit 822, a video processing unit 828, and an audio processing unit 832. In another embodiment, the computer system 800 may include a chipset (not illustrated), which refers to a group of integrated circuits, or chips, that are designed to work with the processing device 802 and controls communications between the processing device 802 and external devices. For example, the chipset may be a set of chips on a motherboard that links the processing device 802 to very high-speed devices, such as main memory 804 and graphic controllers, as well as linking the processing device 802 to lower-speed peripheral buses of peripherals, such as USB, PCI or ISA buses.

The data storage device 818 may include a computer-readable storage medium 824 on which is stored instructions 826 embodying any one or more of the methodologies of functions described herein. The instructions 826 may also reside, completely or at least partially, within the main memory 804 and/or within the processing device 802 during execution thereof by the computer system 800; the main memory 804 and the processing device 802 also constituting computer-readable storage media.

The computer-readable storage medium 824 may also be used to store instructions 826 utilizing logic and/or a software library containing methods that call the above applications. While the computer-readable storage medium 824 is shown in an example embodiment to be a single medium, the term "computer-readable storage medium" or "computer-readable medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Although the embodiments may be herein described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or Ultrabooks™ and may be also used in other devices, such as handheld devices, tablets, other thin notebooks, systems on a chip (SOC) devices, and embedded applications. Some examples of handheld devices include cellular phones, Internet protocol devices, smartphones, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below.

Although the embodiments are herein described with reference to a processor or processing device, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, and/or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware, or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "initiating," "determining," "continuing," "halting," "receiving," "recording," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments described herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An electronic device comprising:
a non-transitory computer-readable storage medium storing instructions; and
at least one processing device in communication with the non-transitory computer-readable storage medium and configured to execute the instructions, the executed instructions causing the at least one processing device to perform operations comprising:
receiving, from a first live content feed, first media content comprising a first set of media content segments;
receiving, from a second live content feed, second media content comprising a second set of media content segments;
receiving, from a server in communication with the at least one processing device, a stored content segment;
determining that the first live content feed and the second live content feed are transmitted to the at least one processing device using a same broadcast timing;
receiving, from a user device in communication with the at least one processing device:
a first insertion rule indicating when to insert a replacement media content segment of the second set of media content segments into the first set of media content segments; and
a second insertion rule indicating when to insert the stored content segment into the first set of media content segments;
creating an augmented output stream from the first media content by:
inserting the replacement media content segment into one content segment of the first set of media content segments when the first insertion rule is satisfied and when the first live content feed and the second live content feed are transmitted using the same broadcast timing; and
inserting the stored content segment to replace another content segment of the first set of media content segments when the second insertion rule is satisfied;
creating a transcoded output stream by transcoding the augmented output stream into a media streaming communication protocol; and
delivering the transcoded output stream via a distributed network channel to a client device in communication with the at least one processing device and including a display device, the client device, in response to receiving the transcoded output stream, configured to display the transcoded output stream on the display device.

2. The electronic device of claim 1, wherein the operations further comprise sending the transcoded output stream to an output stream destination.

3. The electronic device of claim 2, wherein the output stream destination is a hypertext markup language (HTML) web domain.

4. The electronic device of claim 1, wherein the operations further comprise receiving the first live content feed and the second live content feed from an ingest device.

5. The electronic device of claim 1, wherein inserting the replacement media content segment into the first set of media content segments comprises:
determining a segment boundary in the first set of media content segments; and
inserting the replacement media content segment at the segment boundary.

6. The electronic device of claim 1, wherein the first insertion rule comprises a hypertext transfer protocol live streaming (HLS) index file, the HLS index file comprising:
a first HLS tag before an entry in the HLS index file; and
a second HLS tag after the entry in the HLS index file, wherein the first insertion rule is satisfied between the first HLS tag and the second HLS tag.

7. The electronic device of claim 1, wherein the replacement media content segment is a blank space.

8. The electronic device of claim 1, wherein inserting the stored content segment into the first set of media content segments comprises overlaying the first set of media content segments with the stored content segment.

9. The electronic device of claim 1, wherein the stored content segment is selected using a graphical user interface (GUI) of the user device.

10. A method comprising:
receiving, at a processing device, first media content comprising a first set of media content segments from a first live content feed, the first live content feed transmitted according to a first broadcast timing;
receiving, at the processing device, second media content comprising a second set of media content segments from a second live content feed, the second live content feed transmitted according to a second broadcast timing;
receiving, at the processing device, a stored content segment;
receiving, from a user device in communication with the processing device:
a first insertion rule indicating when to insert a replacement media content segment of the second set of media content segments into the first set of media content segments; and
a second insertion rule indicating when to insert the stored content segment into the first set of media content segments;
synchronizing, by the processing device, the first broadcast timing with the second broadcast timing;
creating an augmented output stream from the first media content, when the first broadcast timing and the second broadcast timing are synchronized, by:
inserting the replacement media content segment into one content segment of the first set of media content segments when the first insertion rule is satisfied; and
inserting the stored content segment to replace another content segment of the first set of media content segments when the second insertion rule is satisfied;
creating a transcoded output stream by transcoding the augmented output stream into a media streaming communication protocol; and
delivering the transcoded output stream via a distributed network channel from the processing device to a client device in communication with the processing device and including a display device, the client device in response to receiving the transcoded output stream, configured to display the transcoded output stream on the display device.

11. The method of claim 10, wherein:
the first broadcast timing is a measure of time starting at a first time stamp; and
the second broadcast timing is a measure of time starting at a second time stamp.

12. The method of claim 10, wherein synchronizing the first broadcast timing with the second broadcast timing comprises delaying the first broadcast timing to match the second broadcast timing.

13. The method of claim 10, further comprising sending the transcoded output stream to an output stream destination.

14. The method of claim 10, wherein: synchronizing the first broadcast timing with the second broadcast timing comprises:
   determining a first segment boundary in the first set of media content segments;
   determining a second segment boundary of the replacement media content segment; and
   aligning the first segment boundary with the second segment boundary.

15. The method of claim 10, wherein:
synchronizing the first broadcast timing with the second broadcast timing comprises:
   determining a segment boundary of the replacement media content segment;
   identifying a first media content segment in the first set of media content segments, the first media content segment spanning the segment boundary;
   splitting the first media content segment into a first sub-segment and a second sub-segment at the segment boundary.

16. A method comprising:
receiving, at a processing device, first media content comprising a first set of media content segments from a first live content feed, the first live content feed transmitted according to a first broadcast timing;
receiving, at the processing device, second media content comprising a second set of media content segments from a second live content feed, the second live content feed transmitted according to a second broadcast timing;
receiving, at the processing device, a stored content segment;
receiving, from a user device in communication with the processing device:
a first insertion rule indicating when to insert a replacement media content segment of the second set of media content segments into the first set of media content segments; and
a second insertion rule indicating when to insert the stored content segment into the first set of media content segments;
synchronizing, by the processing device, the first broadcast timing with the second broadcast timing;
creating an augmented output stream from the first media content, when the first broadcast timing and the second broadcast timing are synchronized, by:
inserting the replacement media content segment into one content segment of the first set of media content segments when the first insertion rule is satisfied; and
inserting the stored content segment to replace another content segment of the first set of media content segments when the second insertion rule is satisfied; and
delivering the augmented output stream via a distributed network channel from the processing device to a client device in communication with the processing device and including a display device, the client device, in response to receiving the augmented output stream, configured to display the augmented output stream on the display device.

\* \* \* \* \*